(12) United States Patent
Curren (10) Patent No.: US 9,506,363 B2
(45) Date of Patent: Nov. 29, 2016

(54) WELDING METHOD AND SYSTEM (71) Applicant: ROLLS-ROYCE PLC, London (GB)

(72) Inventor: Matthew David Curren, Chorley (GB)

(73) Assignee: ROLLS-ROYCE plc, London (GB)

( * ) Notice: Subject to any disclaimer, the term of this patent is extended or adjusted under 35 U.S.C. 154(b) by 112 days.

(21) Appl. No.: 14/509,452

(22) Filed: Oct. 8, 2014

(65) Prior Publication Data

US 2015/0107110 A1   Apr. 23, 2015

(30) Foreign Application Priority Data

Oct. 21, 2013   (GB) .................................. 1318523.6

(51) Int. Cl.
*B23K 15/00* (2006.01)
*B23K 37/00* (2006.01)
*F01D 9/04* (2006.01)
*B23K 31/02* (2006.01)
*B23K 37/04* (2006.01)

(52) U.S. Cl.
CPC ............. *F01D 9/044* (2013.01); *B23K 15/006* (2013.01); *B23K 15/0026* (2013.01); *B23K 31/02* (2013.01); *B23K 37/04* (2013.01); *B23K 2201/001* (2013.01); *Y10T 29/49323* (2015.01)

(58) Field of Classification Search
None
See application file for complete search history.

(56) References Cited

U.S. PATENT DOCUMENTS

| | | | | |
|---|---|---|---|---|
| 4,046,988 A | * | 9/1977 | Okuda ................. | B23K 9/1037 219/136 |
| 6,161,750 A | * | 12/2000 | Yang ..................... | B23K 37/06 228/215 |
| 6,568,077 B1 | | 5/2003 | Hellemann et al. | |
| 6,866,179 B2 | * | 3/2005 | Yang ..................... | B23K 9/035 228/41 |

FOREIGN PATENT DOCUMENTS

| | | |
|---|---|---|
| JP | A-55-050987 | 4/1980 |
| JP | S56-119680 A | 9/1981 |
| JP | A-62-286680 | 12/1987 |
| JP | H05-200549 A | 8/1993 |
| JP | A-09-155550 | 6/1997 |
| JP | A-2013-010141 | 1/2013 |

OTHER PUBLICATIONS

Mar. 31, 2015 Search Report issued in European Application No. 14 18 8104.
Search Report issued in British Application No. 1318523.6 dated Apr. 9, 2014.

* cited by examiner

*Primary Examiner* — Devang R Patel
(74) *Attorney, Agent, or Firm* — Oliff PLC (57) ABSTRACT

A welding method including the steps of: providing, in a first position, a weld target assembly having a welding region and a weld tab located adjacent the welding region, the weld tab changeable from a first physical configuration to a second physical configuration when subject to a first type of weld operation; performing a first weld process on the welding region and weld tab; moving the assembly from the first to a second position; providing safeguard apparatus for cooperating with the weld tab to: prevent the assembly from moving to the second position when the first weld procedure did not include the first type of weld operation; and permit the assembly be moved to the second position when the first weld procedure included the first type of weld operation. The assembly includes a sub-assembly having a foot member and blade portion welded together, thereby ultimately forming an output guide vane.

5 Claims, 3 Drawing Sheets

WELDING METHOD AND SYSTEM

FIELD OF THE INVENTION

The present invention relates to a welding method and system for ensuring that a weld target assembly is welded correctly. In particular, the present invention provides a welding method and system suitable for reliably producing outlet guide vanes for use in gas turbine engines.

BACKGROUND OF THE INVENTION

In precision engineering, electron beam welding is used to weld together two or more elements of a weld target assembly into a single body. However, depending on the nature and structure of the elements, it may be necessary to perform different types of weld operation on respective areas of the elements forming the assembly.

For example, in electron beam welding, a penetrative weld is a type of weld operation for creating the functional weld join between respective elements of the assembly; i.e. for creating the strong weld join between the respective elements of the assembly which ensures the integrity of the final assembly is maintained during its use.

However, electron beam welding is also used to perform cosmetic weld operations to produce a cosmetically welded join. A cosmetic weld join is a join which typically does not contribute in any significant way to the overall strength of the welded join, but which may be used for other purposes instead, e.g. to improve the finish of the penetrative weld.

For the same weld target, a penetrative weld is a weld operation resulting in a deeper weld join than a cosmetic weld.

Weld penetration is defined simply by how far into the parent metal the molten metal exists during the weld process.

The common understanding is that a 'penetrative weld' is a weld where the molten metal, and hence the structural joining capability of the weld, is formed to a depth that is a substantial proportion of the parent metal. In the present application, the meaning of penetrative weld may be taken to mean that the molten metal has existed for the full depth of the joint.

However, a cosmetic weld is a weld that is performed not to improve the structural characteristics of the joint, but to improve the visual appearance of the joint. Often the reverse side of a penetrative weld can be of a rough appearance, or have small ridges or troughs. Where electron beam welding is concerned, a cosmetic weld is characterised by a low powered, unfocussed electron beam that serves to melt just the surface layer of the metal (i.e. there is no significant penetration of the molten metal into the parent metal). Surface tension in the molten metal then causes the metal to flow to form a smooth surface.

As well as being visually more attractive, this is also a benefit during handling of the resultant welded body (e.g. it is less likely to snag on or cut fingers) and it also reduces the likelihood of crack initiation under cyclic loading when the resultant welded body is in use. This is particularly important in relation to the present invention, which is particularly useful in the manufacturing of OGVs.

A typical weld process might include a penetrative weld performed on one side of a join, e.g. from the front, and a cosmetic weld performed over the penetratively welded region, or performed on the reverse side of the join, e.g. from the back.

Typically, in order for the cosmetic weld to be performed, e.g. on the reverse side, the weld target assembly is moved from a first position in which the penetrative weld is performed to a second position in which the cosmetic weld is performed. However, conventional welding systems or apparatuses are often not configured such that penetrative weld operations can only be performed on weld target assemblies in the first position or such that cosmetic weld operations can only be performed on weld target assemblies in the second position. This is because, for example, different weld target assemblies may require respectively different weld processes to be performed in (at least) the first and second positions and thus the weld systems and apparatuses are often configured accordingly.

For certain weld target assemblies, the penetrative weld operation must be performed only on a specific side of the assembly. This might be, for example, because performing the penetrative weld operation on the wrong side of the join would spoil or damage the assembly and render it unfit for purpose.

An example of a weld target assembly where the penetrative weld operation must be performed only on the correct side is an outlet guide vane (OGV) for use in a gas turbine engine. A typical OGV weld target assembly, to be subject to e.g. electron beam welding, comprises a blade portion and a foot member (defining a sub-assembly) and one or more weld tabs.

Weld tabs are known generally, and are used in e.g. electron beam welding to improve the quality of the final weld. Weld tabs are also referred to as run-off tabs or weld run-off tabs. In essence, weld tabs provide additional welding regions in which the weld beam can start and/or stop, so that any weld beam cavities created at the beginning and/or end of the weld operation are not present in the final welded assembly, but are present only in the weld tabs. Typically, the weld tabs are machined off after the welding process is complete. In this way, the weld join in the final assembly is more uniform and does not suffer from weld beam cavities, which would otherwise weaken the strength of the weld join.

Nonetheless, if the penetrative weld to join the foot joint to the blade is performed on the incorrect side of the join, then the blade can be distorted, rendering the resulting final OGV assembly unfit for purpose.

Indeed, not all OGV assemblies require the penetrative weld to be performed from the same side, so there is scope for error to perform the penetrative weld operation on the wrong side of the join.

Often, after a penetrative weld has been performed, a cosmetic weld is performed over the penetratively welded region, e.g. the penetratively welded join. However, with conventional weld systems and apparatuses, after a cosmetic weld has been performed, it is often not possible to determine quickly and easily whether or not the penetrative weld was in fact performed because the cosmetic weld masks definitive evidence of the penetrative weld.

Such problems are particularly notable in relation to electron beam welding (but are not exclusive to electron beam welding) for the following reasons. Weld target assemblies subject to electron beam welding are held in a vacuum whilst the weld process takes place, and it is expensive and time consuming to generate the vacuum. Therefore, where the weld process requires multiple weld operations (e.g. a penetrative weld and one or more cosmetic welds), all the weld operations are typically carried out in sequence without breaking the vacuum.

Thus, there is a risk, when performing a series of weld operations including both a penetrative weld and one or more cosmetic welds, that the penetrative weld is performed on the wrong side of a join or not at all, thereby spoiling/damaging the final assembly and rendering it useless.

SUMMARY OF THE INVENTION

In view of these considerations, the present invention proposes a reliable way to ensure that the penetrative weld operation is performed on the correct side of a weld target assembly, for example an assembly incorporating a foot joint (foot member) and a blade (portion) of an outlet guide vane.

An aspect of the present invention proposes a welding method including the steps of: providing, in a first position, a weld target assembly having a welding region and a weld tab located adjacent the welding region, the weld tab being changeable from a first physical configuration to a second physical configuration when subject to a first type of weld operation; performing a first weld process on the welding region and on the weld tab; moving, after performing the first weld process, the assembly from the first position to a second position; providing a safeguard apparatus for cooperating with the weld tab: (i) to prevent the assembly from being moved to the second position when the first weld procedure did not include the first type of weld operation; and (ii) to permit the assembly to be moved to the second position when the first weld procedure did include the first type of weld operation.

Advantageously, the present invention is therefore able to provide a method in which it is not possible to omit the penetrative weld operation before the assembly is moved to the second location, e.g for subsequent processing.

Preferably, the safeguard apparatus is arranged to block the path, between the first and second positions, of the weld tab when the weld tab is in the first physical configuration.

Preferably, the welding method further includes the step of performing a second weld process, including a second type of weld operation, on another welding region of the weld target assembly when the assembly is moved into the second position.

Preferably, the depth of penetration of the first type of weld operation is greater than the depth of penetration of the second type of weld operation. Therefore, the first weld operation may be a penetrative weld operation, and the second weld operation may be a cosmetic weld operation.

The second weld procedure may not include the first type of weld operation.

Preferably, the weld tab is not changeable from the first physical configuration to the second physical configuration when subject to the second type of weld operation. Therefore, advantageously, when the first weld process only includes the second type of weld operation (e.g. in the form of a cosmetic weld), the first weld process is not suitable for changing the weld tab from the first physical configuration to the second physical configuration.

When in the first physical configuration, the weld tab may have larger physical dimensions than when the weld tab is in the second physical configuration. For example, the weld tab preferably projects from the rest of the weld target assembly when in the first configuration.

The extent to which the weld tab projects from the rest of the weld target assembly may be less in the second physical configuration than in the first physical configuration. Therefore, the safeguard means can be arranged to physically engage with the weld tab in the first physical configuration when cooperating with the weld to prevent the assembly from being moved to the second position (e.g. when the first weld procedure did not include the first type of weld operation).

The method may include the step of subjecting the weld tab to the first type of weld operation during the first weld process in order to deform or remove a portion of the weld tab, so that the resulting weld tab is able to cooperate with the safeguard apparatus to permit the assembly to be moved to the second position.

In some embodiments of aspect of the invention, the extent to which the weld tab projects from the rest of the weld target assembly may be less in the first physical configuration than in the second physical configuration. Accordingly, the safeguard means may include a recess or conduit shaped to receive at least a portion of the weld tab in the second configuration, so as to cooperate with the weld tab to permit the assembly to be moved to the second position (when the first weld procedure did include the first type of weld operation). However, the safeguard means is nevertheless arranged to cooperate with the weld tab in the first physical configuration to prevent the assembly from being moved to the second position (when the first weld procedure did not include the first type of weld operation).

The weld tab may include one or more resiliently deformable members, held under tension in a deformed configuration when in the first physical configuration. In response to a first type of weld operation being performed on the weld tab, the or each resiliently deformable member preferably resiles to a rest configuration which is different to the deformed configuration. In the rest position, the resiliently deformable member may not be under tension.

In this case, typically, the extent of projection of the resiliently deformable member from the rest of the weld tab is greater in the second physical configuration than in the first physical configuration.

The safeguard apparatus may include a stop body for cooperating with the weld tab: (a) to prevent the assembly from being moved to the second position when the first weld procedure did not include the first type of weld operation, by bearing against (or by blocking the path of) at least a portion of the weld tab in the first physical configuration; and/or (b) to permit the assembly to be moved to the second position when the first weld procedure did include the first type of weld operation, by receiving at least portion of the weld tab, in the second physical configuration, into one or more correspondingly shaped recesses (or conduits) formed in the stop body.

In (a) the stop body may bear against (or block the path of) the or each resiliently deformable member. In (b) at least a portion of the or each resiliently deformable member may be received by a respective correspondingly (suitably) shaped recess.

A respective corresponding stop body may be provided for each weld tab.

Another aspect of the present invention provides a welding system for use with a weld target assembly having a welding region and a weld tab located adjacent the welding region, the weld tab being changeable from a first physical configuration to a second physical configuration when subject to a first type of weld operation, the welding system including: a locating apparatus for locating the weld target assembly in a first position, and being capable of moving the weld target assembly from the first location to a second location; a welding apparatus arranged to perform a first weld process on the welding region and on the weld tab of the weld target assembly when the weld target is located in the first position; a safeguard apparatus arranged to cooperate with the weld tab: to prevent the assembly from being moved to the second position when the first weld procedure did not include the first type of weld operation; and to permit the assembly to be moved to the second position when the first weld procedure did include the first type of weld operation.

Preferably, the safeguard apparatus is arranged to block the path, between the first and second positions, of the weld tab when the weld tab is in the first physical configuration.

The welding apparatus is preferably further arranged to perform a second weld process, including a second type of weld operation, on (the same or) another welding region of the weld target assembly when the assembly is in the second position.

The welding apparatus is preferably arranged to perform the first and second weld operations such that the depth of penetration of the first type of weld operation is greater than the depth of penetration of the second type of weld operation.

The welding apparatus is preferably arranged not to include the first type of weld operation in the second weld procedure.

Preferably, the weld tab is not changeable from the first physical configuration to the second physical configuration when subject to the second type of weld operation. Therefore, advantageously, when the first weld process only includes the second type of weld operation (e.g. in the form of a cosmetic weld), the first weld process is not suitable for changing the weld tab from the first physical configuration to the second physical configuration.

An aspect of the present invention provide a weld run-off tab for attachment to a weld target sub-assembly, the weld run-off tab including a deformable portion arranged to change its physical configuration in response to a predetermined type of welding operation being performed on it. The change in physical configuration preferably results in a change in the physical dimensions of the weld run-off tab.

An aspect of the present invention provides a weld run-off tab for attachment to a weld target sub-assembly, the weld run-off tab including a resiliently deformable member and a main body, wherein the resiliently deformable member is attached by at least two attachment points to the main body of the weld run-off tab so as to reside in a first deformed configuration, wherein the resiliently deformable member is arranged to resile to a second rest configuration, which is different to the first deformed configuration, in response to detachment of one of the attachment points of the resiliently deformable member from the main body of the weld run-off tab.

In all aspects and embodiments, the component parts of the assembly or sub-assembly are preferably metallic. In all aspects and embodiments, the or each weld tab is preferably metallic.

In all aspects and embodiments of the present invention, the assembly may include a sub-assembly comprising a foot joint or foot member and a blade. The first weld process, e.g. the first weld operation, in particular a penetrative weld operation, may be performed to marry, or join, the foot joint/member and blade together to form an outlet guide vane (also referred to in the art as an exit guide vane). The outlet guide vane may subsequently be incorporated into a gas turbine engine. The outlet guide vane may subsequently be incorporated into an array of outlet guide vanes, which may be incorporated into a gas turbine engine. The array may be arranged circumferentially around the principal, rotational, axis of the gas turbine engine. The gas turbine engine may be a ducted fan gas turbine engine.

In all aspects and embodiments the first weld operation and/or the second weld operation includes (or is) an electron beam welding operation. In all aspects and embodiments the first weld process and/or the second weld process includes an electron beam welding operation.

In all aspects and embodiments, the weld target assembly may be held under vacuum during the welding process. In all aspects and embodiments the safeguard apparatus may be located in a vacuum chamber, e.g. in a vacuum chamber in which the first and/or second weld process is performed.

The present invention includes the combination of the aspects and embodiments and all disclosed preferred or optional features described herein except where such a combination is clearly impermissible or expressly prohibited.

BRIEF DESCRIPTION OF THE DRAWINGS

So that the invention may be more readily understood, and so that further features thereof may be appreciated, embodiments of the invention will now be described by way of example with reference to the accompanying drawings in which.

DETAILED DESCRIPTION AND FURTHER OPTIONAL FEATURES OF THE INVENTION

Figure 1A:
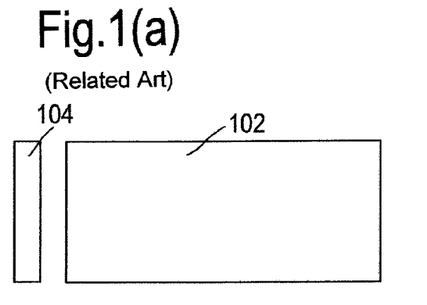
FIG. 1(a), FIG. 1(b) and FIG. 1(c) are examples of a typical weld target assembly, including conventional weld tabs.
Figure 1B:
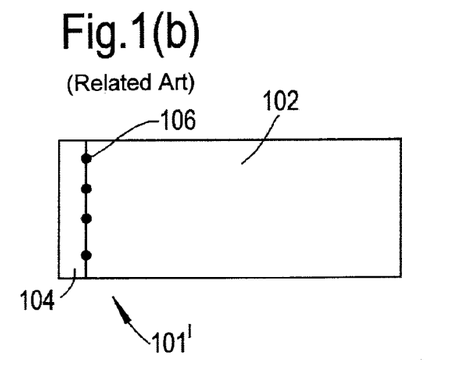
Figure 1C:
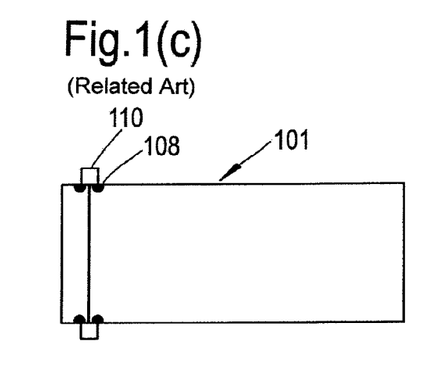

FIGS. 1(a)-1(c) show a typical weld target assembly 101, that might be found in the prior art, in the form of an outlet guide vane (OGV) including conventional weld tabs (weld run-off tabs).

In the example shown in FIG. 1(b), the sub-assembly 101' includes a blade portion 102 and a foot joint or foot member 104. The foot joint is ultimately used to mount the OGV in an array together with other OGVs in a gas turbine engine. The foot joint is typically joined to or married with the blade 102 by using electron beam welding to provide a suitably strong and robust join to withstand the forces applied to the OGV during operation of the gas turbine engine.

Prior to the welding procedure, the foot joint 104 and blade 102 are tack welded together by tack welds 106 to form sub-assembly 101', to hold them rigidly in place for the electron beam welding operation.

Typically, respective conventional weld tabs 110 are tack welded to the sub-assembly 101', e.g. to the foot joint and blade, to provide for the weld beam a run-off region extending beyond the body of the sub-assembly 101'. The conventional weld tabs are typically arranged to be adjacent to the sub-assembly 101' and span across each end of the interface between the foot joint and blade. An example of how the weld tabs may be tack welded 108 are shown in FIG. 1(c).

In usual practice, the assembly 101 shown in FIG. 1(c) is placed in a vacuum chamber for an electron beam welding process to be performed to join the foot join 104 to the blade 102. The weld process typically involves starting a penetrating weld on one of the weld tabs 110, progressively moving the weld beam along the sub-assembly 101' (e.g. along the interface between the foot joint and blade to weld the respective parts together), and finally moving the weld beam beyond the sub-assembly 101' on to the other weld tab to complete the weld operation. Thus, as discussed above, any cavities generated by the weld beam at the start or end of the penetrative weld operation are limited to the weld tabs, and are not present in the final component part (after the weld tabs are machined off). In this sense, conventional weld tabs serve their purpose.

However, a weld tab (weld run-off tab) according to one or more aspects of the present invention achieves additional purposes; an example of which is to prevent the penetrative weld from being performed on the wrong side of a weld target assembly.

Figure 2A:
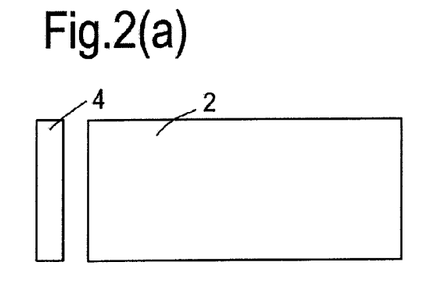
FIG. 2(a), FIG. 2(b) and FIG. 2(c) show a weld assembly including weld tabs according to one or more aspects of the present invention.
Figure 2B:
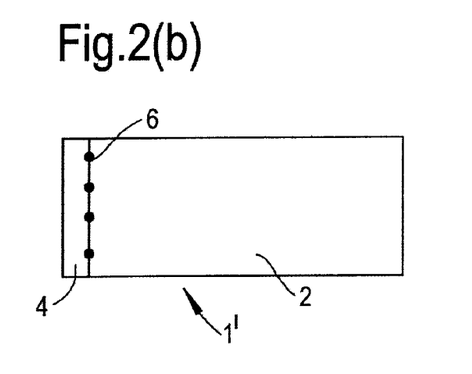
Figure 2C:
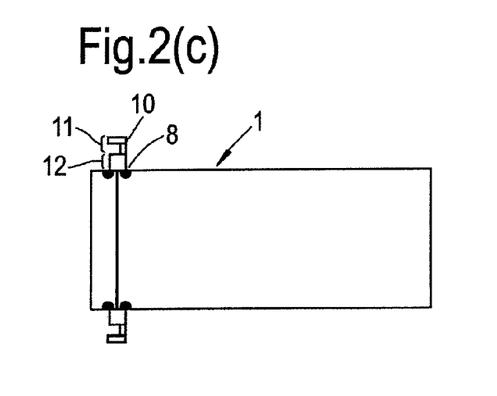

For example, FIGS. 2(a)-2(c) a weld target sub-assembly 1' comprising a first body in the form of a conventional blade portion 2 and a second body in the form of a conventional foot joint 4. As per the conventional sub-assembly 101' above, the first body 4 and the second body 2 are typically weakly held together by tack welds 6 prior to the intended (final) welding process, e.g the electron beam welding process, for marrying them together into a single body.

At least one weld tab 10 is weakly attached to the sub-assembly 1'. For example, a weld tab 10 is weakly attached to the first body and/or second body to be adjacent to the region of the sub-assembly which is to be welded. Typically, the weld tab 10 is arranged to span, or bridge, the region of the sub-assembly 1' including the interface between the first body and the second body. Preferably, the weld tab 10 is arranged such that it is flush with the surface of the region of the sub-assembly which is to be welded.

Preferably, a respective weld tab 10 is arranged adjacent to each end of the region of the sub-assembly which is to be welded. For example, a respective weld tab 10 is preferably located at each end of the region of the sub-assembly 1' to be welded, including the interface between two bodies to be joined together. In particular, a respective weld tab 10 may be provided to span across, or bridge, each end of the interface of the two bodies, e.g. the foot joint 4 and blade 2 shown in FIGS. 2(a)-2(c).

Preferably, each weld tab 10 is arranged such that it is flush with the surface of the region of the sub-assembly which is to be welded.

To perform the weld process to form the final product, e.g. an OGV, the weld target assembly 1 is placed in a first position in a vacuum chamber and subject to a first weld process. The first weld process preferably includes a penetrative weld, in which both the sub-assembly 1' and the weld tab(s) 10 are subject to the penetrative weld beam. The first weld process may further include a cosmetic weld operation, e.g. performed over the penetratively welded region of the assembly 1.

Subsequent to the completion of the first weld operation, the assembly 1 is typically moved to a second position, for example so that a second weld process can be performed. The second weld process may include, for example, a cosmetic weld performed on the reverse side of the assembly 1.

A weld tab according to the present invention differs from conventional weld tabs in that its physical configuration is changed (altered or modified) significantly in response to being subjected to a penetrative weld operation. In particular, the extent to which the weld tab 10 projects from the sub-assembly 1' is changed significantly. In some embodiments, the projection of the weld tab from the sub-assembly is increased. In other embodiments, the projection of the weld tab from the sub-assembly is decreased. But, in all embodiments the physical configuration (e.g. the extent of projection of the weld tab 10 from the sub-assembly 1') is changed as a result of being subject to a penetrative weld operation.

According to the present invention, this change is used to determine whether or not the penetrative weld has been performed, and is exploited to prevent the penetrative weld accidentally being omitted or being performed on the incorrect side of the weld target assembly.

This is achieved by providing safeguard means (e.g. a safeguard apparatus) in the welding environment which cooperates (physically) with the weld tab(s) 10 to prevent the assembly 1 being moved from the first position to the second position in the event that the physical configuration of the weld tab(s) has not changed, thereby indicating that the assembly 1 has not been subject to the required penetrative weld.

However, the safeguard means also cooperates (e.g. physically) with the weld tab(s) to permit the assembly 1 to move to the second position from the first in the event that the physical configuration of the weld tab(s) has changed, thereby indicating that the assembly 1 has been subject to the required penetrative weld.

In other words, the change in physical configuration of the weld tab(s) determines whether or not the weld tab(s) and the safeguard means cooperate to prevent or to permit the movement of the assembly 1 from the first position to the second position.

Figure 3:
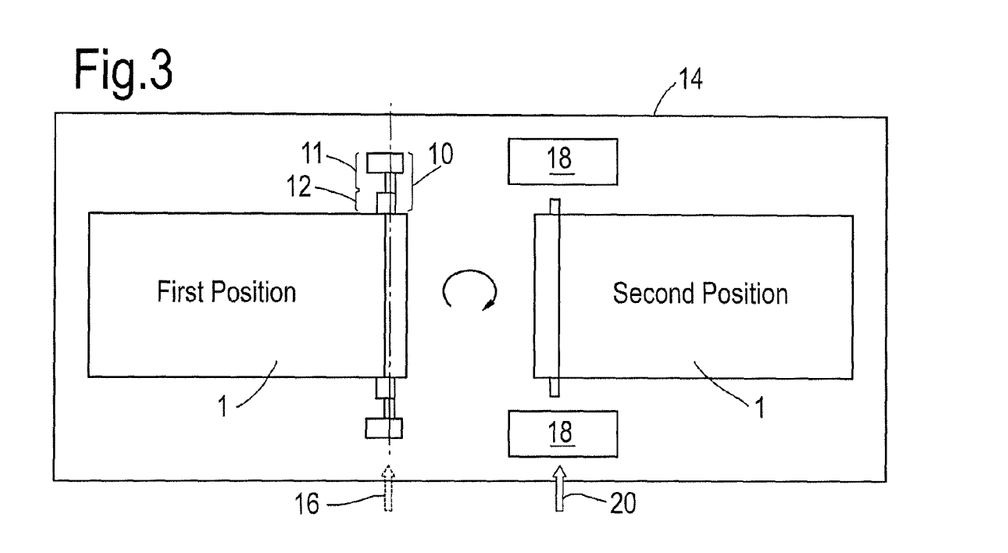
FIG. 3 shows a two stage welding procedure according to one or more aspects of the present invention.
Figure 4A:
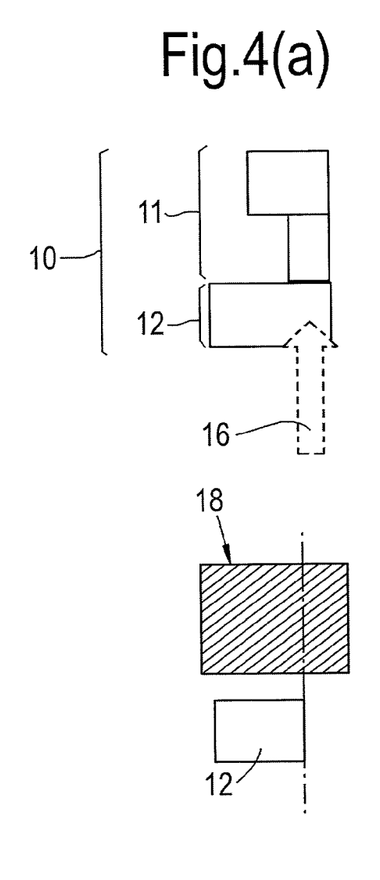
FIG. 4(a), FIG. 4(b) and FIG. 4(c) show various embodiments of weld tabs interacting with respective safeguard apparatuses according to one or more aspects of the present invention.

According to a first embodiment of the present invention, as shown in FIGS. 3 and 4(a), in addition to a run-off portion 12 which is similar in purpose and function as a conventional weld tab, a weld tab 10 according to the present invention differs from conventional weld tabs in that it includes a sacrificial portion 11 which is sacrificed or removed during a penetrative weld operation.

The removal, or sacrifice, of the sacrificial portion 11 results in the change of physical configuration of the weld tab 10, and thus determines how the weld tab 10 and safeguard apparatus cooperate when the assembly 1 is moved towards the second position from the first position.

FIG. 3 represents the sequence of a weld process applied to a weld target assembly 1 including a weld tab 10 according to the present embodiment.

The weld target assembly is located in a vacuum chamber 14 in a first position, as represented by the assembly 1 shown on the left hand side of the figure.

In a first step, a penetrative weld operation 16 is performed along the dotted line superimposed on the assembly 1, as shown in the left hand side of the vacuum chamber 14 of FIG. 3. The penetrative weld securely joins the first body 2 (e.g. the blade) to the second body 4 (e.g. the foot joint). However, the penetrative weld operation also has the effect of removing sacrificial portions 11 from weld tabs 10.

This is shown in the right hand side of vacuum chamber 14 in FIG. 3, where the same assembly 1 has been moved to the second position. In this particular example, the assembly 1 has been flipped (end over end) so that the reverse side of the assembly is facing out of the plane of the page.

In this example, the chamber 14 includes a safeguard apparatus in the form one or more blocking members 18. Blocking members 18 act as a safeguard apparatus by allowing the assembly 1 to be moved to the second position only if the sacrificial portions 11 of the weld tabs have been removed. If the sacrificial portions of the weld tabs have not been removed, then the blocking members 18 prevent the assembly 1 being moved to the second position e.g. by physically preventing (e.g. by blocking) the assembly 1 from reaching the second position. The user, or an automated monitoring system, is then alerted that the penetrative weld, which was intended to be performed in the first position, has not be performed successfully or has not been performed at all.

The blocking members 18 physically prevent (e.g. block) the assembly 1 from reaching the second position, by physically engaging the weld tabs (when the sacrificial portion 11 of the weld tabs have not been removed). For example, a blocking member 18 may be arranged to lie in the path that the sacrificial portion 11 of a weld tab would take when the assembly 1 is moved from the first position to the second position.

Conversely, in the event that the penetrative weld 16 has been performed successfully on the assembly 1, when in the first position, then the sacrificial portion 11 of each weld tab 10 is removed. Therefore, the blocking members 18 do not cooperate with the weld tabs to prevent the assembly from moving to the second position from the first position. Rather, the blocking members 18 cooperate with the modified weld tab 10 to permit the assembly to move to the second position from the first position. In this case, the blocking members do not engage with or otherwise interfere with the weld tabs as the assembly 1 is moved to the second position.

Thus, a second weld process can be performed on the assembly 1 in the second position if desired; for example, a cosmetic weld 20 can be performed on e.g. the reverse side of the assembly 1.

As shown in FIG. 3, the sacrificial portion 11 is aligned with the region of the sub-assembly 1' which is to be subject to a penetrative weld, so that as the weld beam is moved along its intended path with the respect to the sub-assembly 1', it proceeds on to the weld tab 10, and in particular on to the sacrificial portion 11 in order to remove or deform the sacrificial portion 11.

According to the present embodiment, the sacrificial portion 11 includes a relatively narrow portion, which the penetrative weld beam is able to deform to the extent that the sacrificial portion 11 is ultimately removed from the weld tab. However, the sacrificial portion 11 must not be so narrow that a cosmetic weld could deform it sufficiently to remove it.

An example of a suitable sacrificial portion 11 for use with electron beam welding techniques would be a metallic strip approximately 2-3 mm deep and approximately 2-3 mm wide. However, the precise dimensions and characteristics of a suitable sacrificial portion 11, and in particular the dimensions and characteristics of the relatively narrow portion, will depend on the nature of the weld target assembly and the nature of the welding apparatus which is to be used. A person skilled in the art, having the benefit of the teaching of this document, is capable of conceiving a suitable sacrificial portion to suit the particular requirements.

Figure 4B:
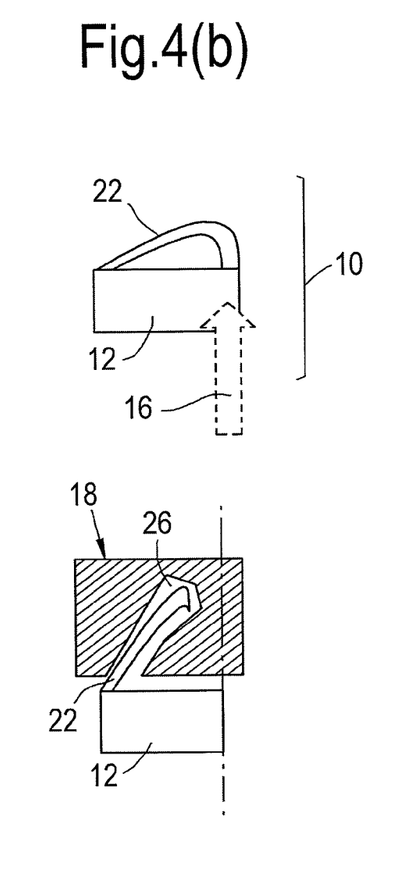

According to a second embodiment of the present invention, when subject to a penetrative weld operation, the physical configuration of the weld tab 10 is able to be changed in a different way to that of the first embodiment.

For example, FIG. 4(b) shows an example of a weld tab 10 having a run-off portion 12 similar to the weld tab of the first embodiment, but having sprung member 22 instead of the sacrificial portion 11.

Sprung member 22 is formed of a resiliently deformable material, e.g. a band of resiliently deformable material. Sprung member 22 is preferably formed to be attached to the run-off portion 12 by two attachment portions, e.g. by each of its two distal ends.

As shown in FIG. 4(b), in a first physical configuration, sprung member 22 is held under tension in an active position (first position). In a second physical configuration, sprung member 22 lies in a rest position (second position). The rest position is different to the active position (first position). Changing the sprung member 22 from the first physical configuration to the second physical configuration is achieved by detaching one of the two attachment portions from the run-off portion 12. This results in sprung member 22 resiling to the rest position (second position). In the rest position, the resiled sprung member 22 is typically not under tension.

Thus, the physical configuration of weld tab 10 of the second embodiment is changeable (such that the sprung member 22 moves from its active position to its rest position) in response to a penetrative weld being performed on the sprung member so as to detach, from the run-off portion 12, one of the attachment portions of the sprung member 22.

In a welding method employing a weld tab according to this second embodiment, the weld tab 10 is generally arranged with respect to the sub-assembly 1' as in the first embodiment, except that one of the described attachment portions of the sprung member 22 is arranged to lie on the path of the penetrative weld beam path, so as to be detached from the run-off portion 12 during the penetrative weld process.

It is intended that the attachment portion of sprung member 22 which is to be detached from the run-off portion 12 is removed or sacrificed by the penetrative weld operation so as to allow the sprung member 22 to resile to its rest position. Thus, the attachment portion can be considered to be a sacrificial attachment portion.

In this second embodiment, the blocking means 18 (safeguard apparatus) is arranged suitably so that it cooperates with the weld tab 10, preferably at least with the sprung member 22, to prevent the assembly being moved to the second position when the weld tab 10 (when the sprung member 22) is in the first physical configuration, but to cooperate with the weld tab 10, preferably at least with the sprung member 22, to permit the assembly to be moved to the second position when the weld tab 10 (when the sprung member 22) is in the second physical configuration.

The blocking means is preferably arranged to cooperate with the sprung member 22 to prevent the assembly 1 from being moved to the second position when the sprung member 22 is in its active position—for example, the blocking means 18 is arranged to physically prevent (e.g. by blocking) the assembly 1 from being moved to the second position. The blocking means 18 preferably cooperates with the sprung member 22 in the active position to prevent the assembly 1 being moved to the second position by physically engaging (e.g. by blocking) the sprung member 22 when it is in the active position.

Nonetheless, the blocking means (safeguard apparatus) preferably includes a recess or conduit 26 for receiving the sprung member 22 in its rest position to permit the assembly 1 to move to, and to be located in, the second position. Accordingly, the recess or conduit 26 is suitably (complementarily) shaped to receive the sprung member when in its rest position.

The blocking means may be located (e.g. in a vacuum chamber) to cooperate with the sprung member 22 along the path taken by the sprung member 22 when the assembly 1 is moved from the first position to the second position. The blocking means 18 may therefore include a conduit through which the sprung member 22 in the rest position is able to pass.

The blocking means may be located (e.g. in a vacuum chamber) proximate to the second position, for example close to the end of the path taken by the sprung member 22 when the assembly is moved from the first position to the second position. Accordingly, the blocking member 18 may include a recess in which the sprung member 22 in the rest position is receivable, or seatable, when the assembly 1 is in the rest position.

Figure 4C:
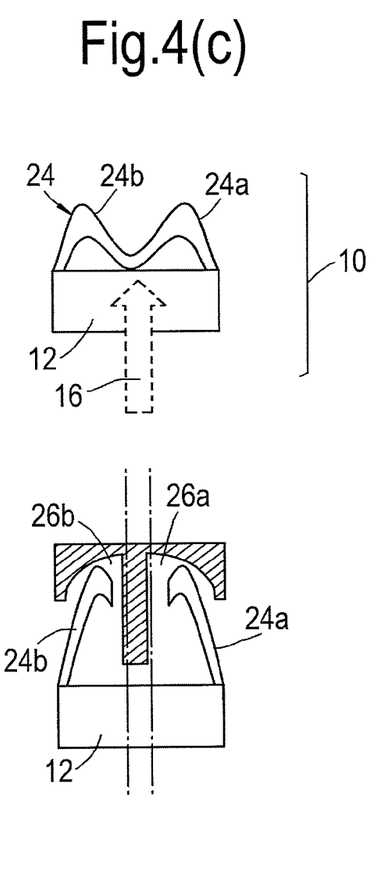

According to a third embodiment of the present invention, a weld tab 10 similar to that of the second embodiment but having a sprung member 24 in an alternative form to that of the second embodiment is provided.

Sprung member 24 according to the third embodiment is formed of a resiliently deformable material, e.g. a band of resiliently deformable material.

Sprung member 24 is preferably formed to be attached to the run-off portion 12 by two attachment portions, e.g. each of two distal ends of a single sprung member body, and by a further intermediate attachment portion located along its length between the two attachment portions.

Sprung member 24 may therefore form a general M shape. Sprung member 24 thus provides a pair of sprung fingers 24a and 24b.

As shown in FIG. 4(c), in a first physical configuration, each sprung finger 24a, 24b of sprung member 24 is held under tension in an active position (first position). In a second physical configuration, each spring finger 24a, 24b of sprung member 24 lies in its respective rest position (second position), which is different to the active position (first position). Changing the sprung member 24 from the first physical configuration to the second physical configuration is achieved by detaching the intermediate attachment portion from the run-off portion 12. This results in each of the spring fingers 24a, 24b of sprung member 24 resiling to its respective rest position. In the rest position, each of the resiled sprung fingers 24a, 24b are typically not under tension.

Thus, the physical configuration of weld tab 10 of the third embodiment is changeable, such that each spring finger 24a, 24b of the sprung member 24 moves from its active position to its rest position, in response to a penetrative weld being performed on the sprung member 24 so as to detach, from the run-off portion 12, the intermediate attachment portion of the sprung member 24.

In a welding method employing a weld tab according to this third embodiment, the weld tab 10 is generally arranged with respect to the sub-assembly 1' as in the first and second embodiments, except that the intermediate attachment portion of the sprung member 24 is arranged to lie on the path of the penetrative weld beam path, so as to be detached from the run-off portion 12 during the penetrative weld process.

It is intended that the intermediate attachment portion of sprung member 24 which is to be detached from the run-off portion 12 is removed or sacrificed by the penetrative weld operation in order to allow the sprung fingers 24a, 24b of sprung member 24 to resile to their respective rest positions. Thus, the intermediate attachment portion can be considered to be a sacrificial attachment portion.

In this third embodiment, the blocking means 18 (safeguard apparatus) is arranged suitably so that it cooperates with the weld tab 10, preferably at least with the sprung fingers 24a, 24b of the sprung member 24, to prevent the assembly being moved to the second position when the weld tab 10 (when the sprung member 24) is in the first physical configuration, but to cooperate with the weld tab 10, preferably at least with the sprung fingers 24a, 24b of the sprung member 24, to permit the assembly to be moved to the second position when the weld tab 10 (when the sprung member 24) is in the second physical configuration.

In other words, the blocking means is preferably arranged to cooperate with the sprung member 24 to prevent the assembly 1 from being moved to the second position when the sprung fingers 24a, 24b of the sprung member 24 are in the active position—for example, the blocking means 18 is arranged to physically prevent (e.g. by blocking) the assembly 1 from being moved to the second position. The blocking means 18 preferably cooperates with the sprung member 24 in the active position to prevent the assembly 1 being moved to the second position by physically engaging (e.g. by blocking) the sprung fingers 24a, 24b of the sprung member 24 when in the active position.

The blocking means 18 preferably includes a recess or conduit for receiving the sprung fingers 24a, 24b of the sprung member 24 in the rest position to permit the assembly 1 to move to, and to be located in, the second position. Accordingly, the recess or conduit is suitably (complementarily) shaped to receive the sprung fingers 24a, 24b of the sprung member 24 when in the rest position to permit the assembly 1 to move to and to be located in the second position.

However, it is preferred that the blocking means (safeguard apparatus) includes a respective recess or conduit 26a, 26b for receiving each of the sprung fingers 24a, 24b in its rest position to permit the assembly 1 to move to and to be located at the second position. Accordingly, each recess or conduit is complementarily (suitably) shaped to receive a respective sprung finger 24a or 24b in its rest position.

The blocking means may be located (e.g. in a vacuum chamber) to cooperate with the sprung member 24 along the path taken by the sprung member 24 when the assembly 1 is moved from the first position to the second position. The blocking means 18 may therefore include a conduit or conduits through which the sprung fingers 24a, 24b of the sprung member 22 in the rest position are able to pass.

The blocking means may be located (e.g. in a vacuum chamber) proximate to the second position, for example close to the end of the path taken by the sprung member 24 when the assembly is moved from the first position to the second position. Accordingly, the blocking member 18 may include a recess or recesses in which the sprung fingers 24a, 24b of the sprung member 24 in the rest position are receivable, or seatable, when the assembly 1 is in the rest position.

In the second and third embodiments, it is conceivable that the sprung member 22, 24 could be placed under suitable tension so as to project from the run-off portion 12 to a greater extent when in the active position than when in the rest position. In this case, there may be no need for a suitably shaped recess or conduit to be formed in the blocking means 18 (safeguard apparatus). Rather, the blocking means would preferably cooperate with the sprung member 22 in the active position to prevent the assembly 1 being moved to the second position e.g. by physically engaging (e.g. by blocking) the sprung member 22, 24 in the active position. Whereas, the blocking means could be arranged to cooperate with the sprung member 22, 24 in the rest position to permit the assembly 1 to move to the second position by providing sufficient clearance with the sprung member 22, 24 in the rest position for the assembly 1 to be moved to and located in the second position.

In all aspects and embodiments, after the welding processes performed on the assembly are complete (e.g. after the welding processes to join/marry the foot joint to the blade to provide an OGV suitable for a gas turbine are complete) any remnants of the weld tab(s) are removable by conventional methods, e.g. by machining and/or polishing the welded OGV component.

Figure 5:
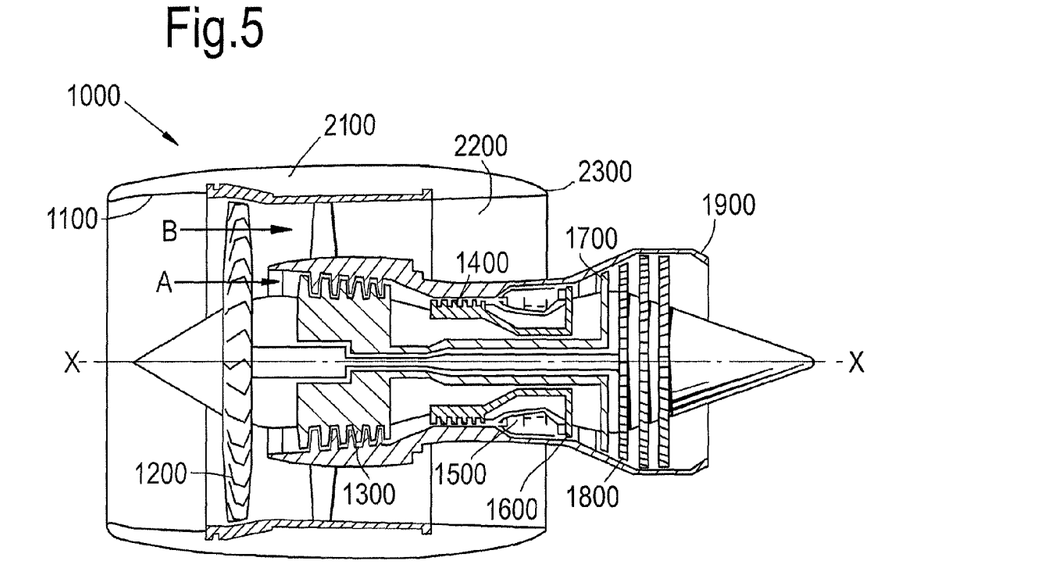
FIG. 5 shows a ducted fan gas turbine engine incorporating an outlet guide vane produced according to one or more aspects of the present invention.

With reference to FIG. 5, a ducted fan gas turbine engine incorporating the invention is generally indicated at 1000 and has a principal and rotational axis X-X. The engine comprises, in axial flow series, an air intake 1100, a propulsive fan 1200, an intermediate pressure compressor 1300, a high-pressure compressor 1400, combustion equipment 1500, a high-pressure turbine 1600, an intermediate pressure turbine 1700, a low-pressure turbine 1800 and a core engine exhaust nozzle 1900. A nacelle 2100 generally surrounds the engine 1000 and defines the intake 1100, a bypass duct 2200 and a bypass exhaust nozzle 2300.

During operation, air entering the intake 1100 is accelerated by the fan 1200 to produce two air flows: a first air flow A into the intermediate pressure compressor 1300 and a second air flow B which passes through the bypass duct 2200 to provide propulsive thrust. The intermediate pressure compressor 1300 compresses the air flow A directed into it before delivering that air to the high pressure compressor 1400 where further compression takes place.

The compressed air exhausted from the high-pressure compressor 1400 is directed into the combustion equipment 1500 where it is mixed with fuel and the mixture combusted. The resultant hot combustion products then expand through, and thereby drive the high, intermediate and low-pressure turbines 1600, 1700, 1800 before being exhausted through the nozzle 1900 to provide additional propulsive thrust. The high, intermediate and low-pressure turbines respectively drive the high and intermediate pressure compressors 1400, 1300 and the fan 1200 by suitable interconnecting shafts.

Different types of OGV can be produced according to aspects of the present invention. For example, an OGV produced according to the present invention is typically incorporated in a circumferential array of OGVs located downstream of the fan 1200. The circumferential array of OGVs generates axial flow in the gas leaving the array.

However, different gas turbine engines may locate the OGVs in different locations. For example, The OGV arrays in some large civil gas turbine engines (e.g. Rolls Royce Trent engines) are positioned closer to the fan than shown in FIG. 5—e.g. they are typically aligned axially with the engine section stators (ESSs) which form the entry to the core, indicated generally by the arrowhead of arrow A. This permits a structural path from the engine mounts on the outside of the case through the OGV assembly, through the static ESSs and into the bearing arrangement within the ESS ring.

However, some other engines typically have a different structural arrangement due to their 2-shaft rather than 3-shaft nature. As such, OGVs in these other engines don't carry as much load and are situated axially rearwards compared to those in the aforementioned Rolls-Royce engines.

Clearly the disclosed welding method is well suited to the production of OGVs for the aforementioned Rolls Royce engines, as they may need to carry more load than OGVs used in other engines, and thus a good weld is considered to be important.

However, on the basis that a principal problem that the presently claimed invention is able to overcome is the prevention of distortion, the present invention is equally applicable to, and important for, any OGVs produced with a welded joint.

When used in this specification and claims, the terms "comprises" and "comprising" and variations thereof mean that the specified features, steps or integers are included. The terms are not to be interpreted to exclude the presence of other features, steps or integers.

The features disclosed in the foregoing description, or in the following claims, or in the accompanying drawings, expressed in their specific forms or in terms of a means for performing the disclosed function, or a method or process for obtaining the disclosed results, as appropriate, may, separately, or in any combination of such features, be utilised for realising the invention in diverse forms thereof.

While the invention has been described in conjunction with the exemplary embodiments described above, many equivalent modifications and variations will be apparent to those skilled in the art when given this disclosure. Accordingly, the exemplary embodiments of the invention set forth above are considered to be illustrative and not limiting. Various changes to the described embodiments may be made without departing from the spirit and scope of the invention.

In particular, it is noted that the present invention has been explained using the example of an outlet guide vane (OGV). Whilst the present invention is highly relevant to the manufacture of OGVs, the present invention is not limited to the manufacture of OGVs. The invention is applicable to any suitable weld target assembly. So, where the term foot joint or foot member is used herein, the broader term first body may be substituted for it. Where the term blade or blade portion is used herein, the broader term second body may be substituted. The first and second bodies therefore being arrangable to provide a sub-assembly as discussed herein. The sub-assembly and weld tabs therefore being combinable to provide an assembly (a weld target assembly) as discussed herein.

Furthermore, whilst the present invention has been exemplified with reference to electron beam welding, the invention should not be considered to be limited for use with electron beam welding, unless explicitly stated.

The invention claimed is:

1. A welding system comprising:
   a weld target assembly comprising at least one weld tab;
   a welding apparatus configured to perform a first weld process and a second weld process on the weld target assembly, the first weld process configured to change the physical configuration of the at least one weld tab from a first physical configuration to a second physical configuration;
   a first portion configured to receive the weld target assembly in a first position;
   a second portion downstream of the first portion, the second portion configured to receive the weld target assembly in a second position; and
   at least one blocking member configured to cooperate with the at least one weld tab to prevent the well target assembly from being received in the second position when the at least one weld tab is in the first physical configuration,
   wherein the first weld process is performed on the weld target assembly in the first position in the first portion, and the second weld process is performed on the weld target assembly in the second position in the second portion.

2. The system of claim 1, wherein in the first physical configuration the at least one weld tab comprises a sacrificial portion, and the first weld process removes the sacrificial portion so that in the second physical configuration the sacrificial portion is absent.

3. The system of claim 1, wherein in the first physical configuration the at least one weld tab comprises a sprung member which is attached under tension to the weld target assembly by an attachment portion, and the first weld process removes the attachment portion so that in the second physical configuration the sprung member lies in a rest position.

4. The system of claim 1, further comprising a chamber configured to house the weld target assembly, the welding apparatus, the first portion, the second portion and the at least one blocking member, wherein the at least one blocking member is disposed on the chamber.

5. A welding system comprising:

a weld target assembly comprising at least one weld tab comprising a sacrificial portion;

a welding apparatus configured to perform a first weld process and a second weld process on the weld target assembly, the first weld process configured to remove the sacrificial portion from the at least one weld tab in order to change the at least one weld tab from a first physical configuration to a second physical configuration;

a first portion configured to receive the weld target assembly in a first position;

a second portion downstream of the first portion, the second portion configured to receive the weld target assembly in a second position; and at least one blocking member configured to cooperate with the at least one weld tab to prevent the weld target assembly from being received in the second position when the at least one weld tab is in the first physical configuration, wherein the first weld process is performed on the weld target assembly in the first position in the first portion and the second weld process is performed on the weld target assembly in the second position in the second portion.

* * * * *